(12) United States Patent
Hartmann et al.

(10) Patent No.: US 7,084,768 B2
(45) Date of Patent: Aug. 1, 2006

(54) ANTI-COLLISION INTERROGATION PULSE FOCUSING SYSTEM FOR USE WITH MULTIPLE SURFACE ACOUSTIC WAVE IDENTIFICATION TAGS AND METHOD OF OPERATION THEREOF

(75) Inventors: Clinton S. Hartmann, Dallas, TX (US); Lewis T. Claiborne, Richardson, TX (US)

(73) Assignee: RF Saw Components, Inc., Richardson, TX (US)

( * ) Notice: Subject to any disclaimer, the term of this patent is extended or adjusted under 35 U.S.C. 154(b) by 0 days.

(21) Appl. No.: 10/103,650

(22) Filed: Mar. 21, 2002

(65) Prior Publication Data

US 2003/0179077 A1 Sep. 25, 2003

(51) Int. Cl.
*G08B 13/14* (2006.01)
(52) U.S. Cl. ............... 340/572.7; 340/10.2; 342/44; 367/138
(58) Field of Classification Search ........... 340/572.7, 340/572.1, 572.4, 10.2; 310/313 R, 313 D; 342/42, 44, 51; 343/757; 367/138
See application file for complete search history.

(56) References Cited

U.S. PATENT DOCUMENTS

| | | | | |
|---|---|---|---|---|
| 3,852,755 A | * | 12/1974 | Works et al. | 343/701 |
| 4,058,217 A | * | 11/1977 | Vaughan et al. | 209/74 |
| 4,445,028 A | * | 4/1984 | Huber | 235/472.01 |
| 5,381,137 A | | 1/1995 | Ghaem et al. | |
| 5,701,127 A | * | 12/1997 | Sharpe | 342/42 |
| 5,734,326 A | | 3/1998 | Skudera, Jr. | |
| 5,777,561 A | | 7/1998 | Chieu et al. | |
| 6,069,564 A | | 5/2000 | Hatano et al. | |
| 6,259,991 B1 | * | 7/2001 | Nysen | 701/300 |
| 6,318,636 B1 | | 11/2001 | Reynolds et al. | |
| 6,462,698 B1 | * | 10/2002 | Campbell et al. | 342/51 |
| 6,611,224 B1 | * | 8/2003 | Nysen et al. | 342/42 |

FOREIGN PATENT DOCUMENTS

WO 50849 8/2000

OTHER PUBLICATIONS

Johnson R.C., "Antenna Engineering Handbook, Third Edition" 1993; McGraw-Hill; US XP002251973 ISBN: 0-07-03281-X; Chapter 10: Leaky-Wave Antennas; Chapter 13: Helical Antennas; Chapter 17: Reflector Antennas; Chapter 20: Phased Arrays.

* cited by examiner

*Primary Examiner*—Thomas Mullen

(57) ABSTRACT

The present invention provides a system for avoiding code collisions from multiple SAW identification tags and a method of operating such system. In one embodiment the invention provides for (1) focusing an interrogation pulse to within a defined space; and (2) discriminating between coded responses returned from tags located within such defined space.

13 Claims, 8 Drawing Sheets

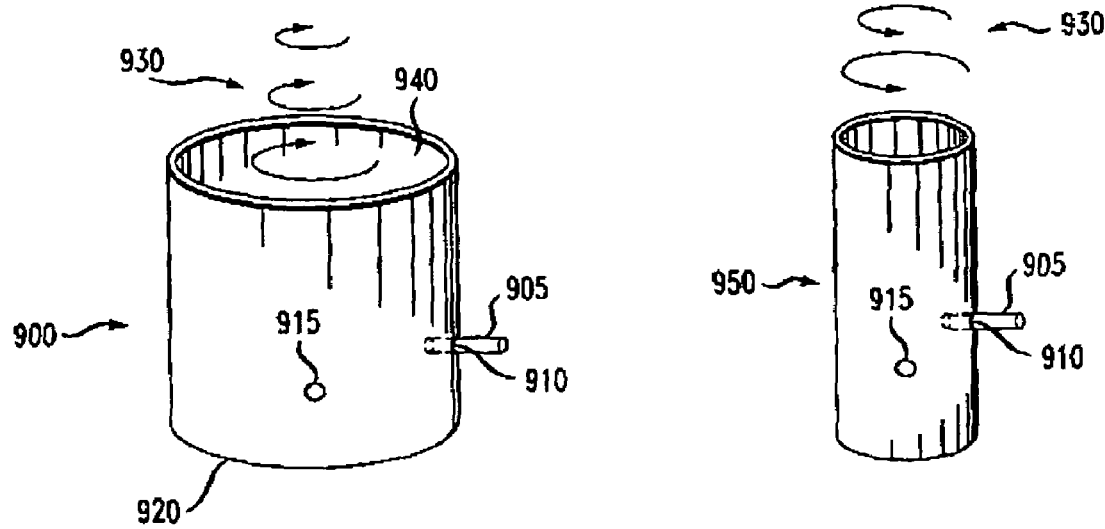
FIG. 9A
FIG. 9B
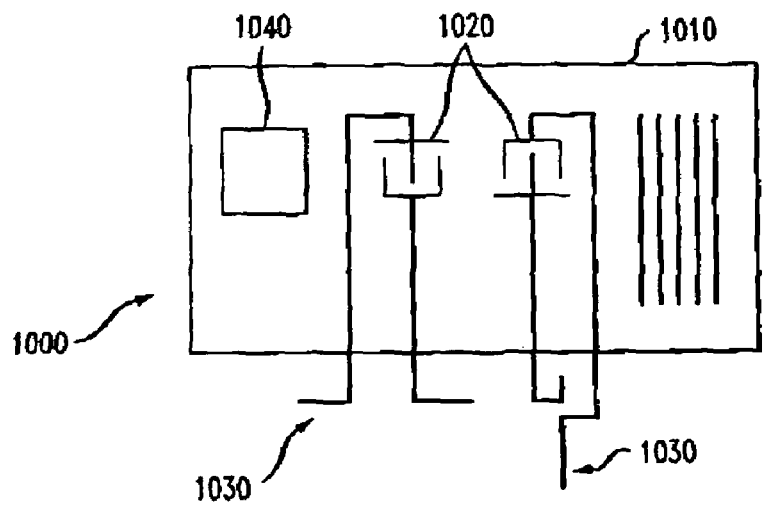
FIG. 10

ANTI-COLLISION INTERROGATION PULSE FOCUSING SYSTEM FOR USE WITH MULTIPLE SURFACE ACOUSTIC WAVE IDENTIFICATION TAGS AND METHOD OF OPERATION THEREOF

TECHNICAL FIELD OF THE INVENTION

The present invention is directed, in general, to a signal focusing system and, more specifically, to a system to discriminate between multiple surface acoustic wave (SAW) identification tags by focusing an interrogation pulse and a method of operation thereof.

BACKGROUND OF THE INVENTION

There are a number of electronic identification methods and devices presently in use. Everyone is familiar with the ubiquitous bar codes and magnetic strips that, together with their readers, are widely employed by businesses and others. An inherent limitation of bar codes and magnetic strip is the effective range at which they can be read, which is quite short. Magnetic strips, for example, generally require the reader to be in direct contact with the strip in order to detect and decode any data. In the very few cases where a magnetic strip is read with a device other than a direct contact reader, the effective reading range is still only a few centimeters at best. Similarly, the effective range at which bar codes can be reliably read is typically no better than a few centimeters. Because the read range for bar codes and magnetic strip is so short, they are usually read one at a time and seldom does one bar code or magnetic strip interfere with another.

Another prior art identification device is the radio frequency identification ("RFID") tag. When interrogated, RFID tags reflect or retransmit a radio frequency signal that returns an encoded identification number, such as the RFID tags used to collect highway and bridge tolls. Although prior art RFID tags based on a chip have a longer reliable range than magnetic strips or bar codes, they are generally so expensive that they are not widely used, which means that each prior art RFID tag is generally individually read. In short, very little opportunity exists for prior art RFID tags to interfere with one another.

With the introduction of inexpensive identification tags based on surface acoustic wave (SAW) technology that can be read at a relatively long range, certain interference problems must now be addressed. Although there will not be a problem where SAW tags are individually read or simultaneously read in small groups, such will not be the case where a large number of SAW tags are being simultaneously interrogated. Such would be the case, for example, where a large number of articles are stacked on a pallet with each article bearing its own globally unique SAW tag. The large number of responses to an interrogation pulse would make it difficult for the SAW tag reader to accurately detect and decode each response in order to reliably identify each article on the pallet. This type of code collision problem as well as the inter-symbol interference problem caused by so many responses being transmitted at one time needs to be addressed before the full potential using SAW identification tags can be realized.

Accordingly, what is needed in the art is a system for focusing an interrogation pulse to within a defined space so that a SAW identification tag reader can discriminate between coded responses returned from SAW tags located within that space.

SUMMARY OF THE INVENTION

To address the above-discussed deficiencies of the prior art, the present invention provides a system for avoiding code collisions from multiple SAW identification tags and a method of operating such system. In one embodiment the invention provides for (1) focusing an interrogation pulse to within a defined space; and (2) discriminating between coded responses returned from tags located within such defined space.

The present invention thus provides a system for controlling potential identification signal collisions where an interrogation signal can generate responses from multiple SAW identification tags. The system described herein is useful in an environment where several SAW identification tags simultaneously transmit identification signals in response to an interrogation pulse. If a large enough number of responses are generated at one time in the allocated frequency bandwidth, a SAW tag reader will have difficulty in accurately detecting and decoding such responses. The present invention limits the number of potential responses to a level where the SAW tag reader is able to accurately detect and decode responses to an interrogation signal.

In one embodiment of the invention the system uses beam steering to focus the interrogation pulse within the defined space. In another embodiment an antenna is used to focus the interrogation pulse within the defined space. An aspect of this embodiment provides for an antenna that is a parallel conductor pair. This is a particularly useful embodiment that permits interrogation while in close proximity to a SAW tag. In still another aspect the antenna is a helical antenna while in yet still another the antenna is a dielectric waveguide antenna.

In another embodiment of the invention a reflector is coupled to the antenna. One aspect of this embodiment provides for a reflector that is an elliptical trough. The elliptical trough is a particularly useful focusing device when used with an antenna. In another embodiment of the invention the reflector is selected from the group consisting of: a circular reflector; a curved reflector; a parabolic reflector; a re-entrant cavity; and an elliptical reflector.

In another embodiment of the invention the interrogation pulse is focused within the defined space by a waveguide. One aspect of this embodiment provides for a waveguide that projects a circular polarized beam. In another aspect of this embodiment the waveguide has a first feed of about one-quarter wave length positioned at about a 90° position relative to a second feed of about one-quarter wave length. In yet another embodiment of the invention a reflector is coupled to the waveguide. A particularly useful aspect of this embodiment provides for the reflector to be selected from the group consisting of: a circular reflector; a curved reflector; a parabolic reflector; a re-entrant cavity; and an elliptical reflector.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIGS. 9A–9B, illustrate embodiments of an interrogation pulse focusing device constructed in accordance with the present invention that can be used to launch both right hand and left hand circular polarized interrogation pulses; and FIG. 10 illustrates a SAW tag embodiment where the response to an interrogation pulse can be turned off.

DETAILED DESCRIPTION

Figure 1:
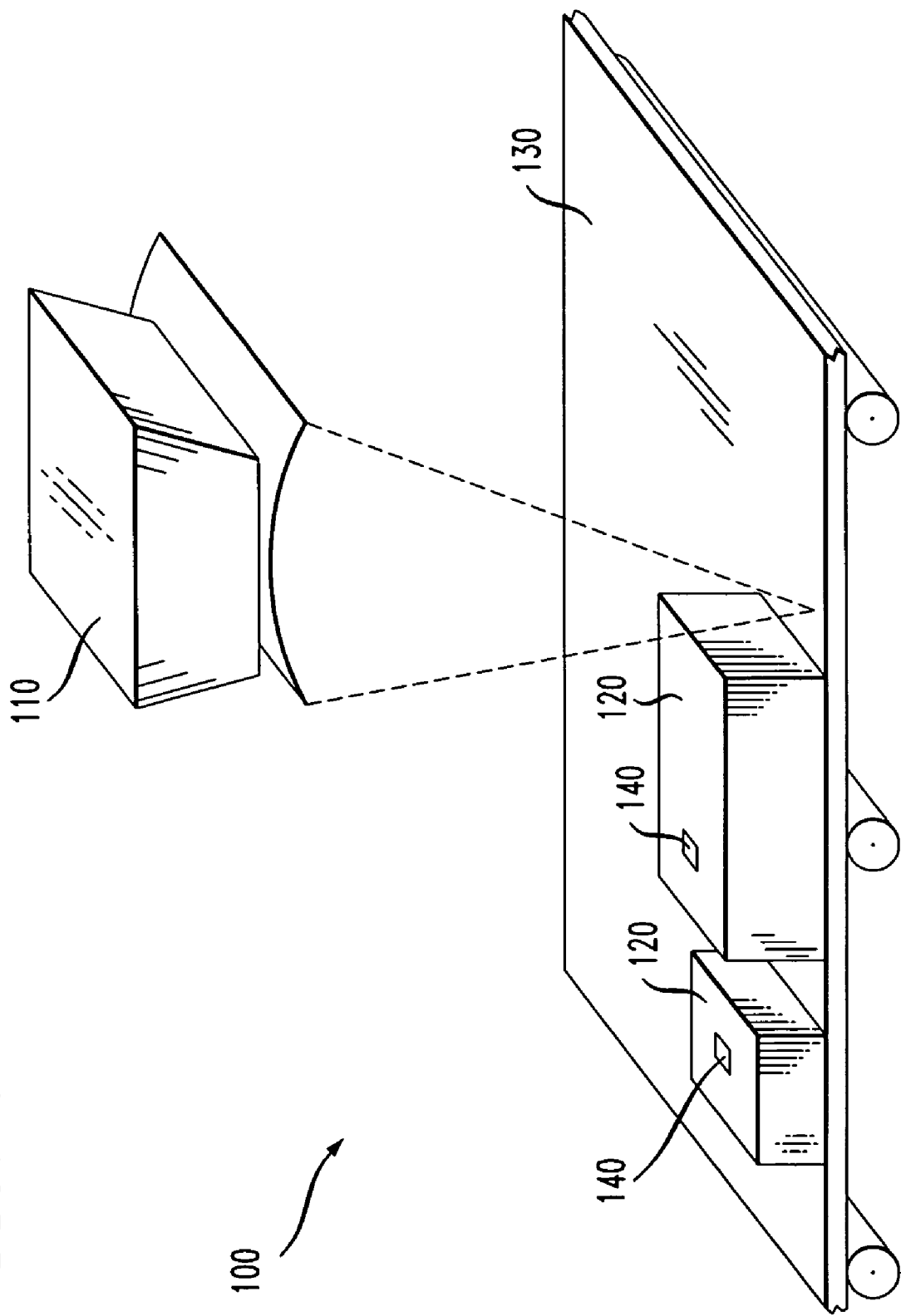
FIG. 1 illustrates a representative article handling device, such as that used to handle parcels or baggage, where an embodiment of a SAW identification tag reader is being used to identify articles.

Referring initially to FIG. 1, illustrated is a representative article handling device 100, such as that used to handle parcels or baggage, where an embodiment of a SAW identification tag reader 110 is being used to identify articles 120. A conveyor belt 130 being used to transport articles 120 from one location to another has a SAW identification tag reader 110 associated with it in a position where it can transmit interrogation pulses to generate responses from SAW tags 140 on the articles 120. Each SAW tag 140 responds to the interrogation pulse by transmitting its own globally unique coded response. The reader 110 detects and decodes these responses and identifies each SAW tag 140 and, inferentially, the parcel 120 to which it is attached.

A complete and detailed description of SAW identification tags 120 is set forth in detail in U.S. patent application Ser. No. 10/024,624, entitled "Surface Acoustic Wave Identification Tag Having Enhanced Data Content and Methods of Operation and Manufacture Thereof," Hartmann, Clinton S. ("Hartmann One"), commonly assigned with the invention and incorporated herein by reference. A description of SAW identification tag readers 130 is described in detail in U.S. Pat. No. 6,708,881, entitled "Reader For a High Information Capacity Saw Identification Tag and Method of Use Thereof," Hartmann, Clinton S. ("Hartmann Three"), also commonly assigned with the invention and incorporated herein by reference.

When a limited number of articles to be identified are being transported on the conveyor belt 130, the SAW tag reader 110 will most probably be able to isolate and decode each response. Such would be the case, for example, if the device 100 were a luggage handling apparatus with suitcases and other luggage items being transported by the conveyor belt 130 in more or less of a line so that only one or two SAW tags 140 are being interrogated at the same time. However, if the number of articles 120 being interrogated is very large, such as would be the case if a pallet of articles 120, each with its own SAW tag 140, was being interrogated, a correspondingly large number of responses would be generated. The large number of responses being simultaneously generated could make it difficult for the SAW tag reader 110 to accurately detect and decode each response so that each article 120 could be reliably identified. This code collision problem is caused by both the large amount of data required to be detected and processed as well as by the inter-symbol interference generated from so many responses being transmitted at one time. The present invention provides a system for avoiding such code collisions as well as a method of operating such system.

The present invention provides a system for focusing an interrogation pulse to within a defined space so the SAW identification tag reader 110 can discriminate between coded responses. By using the present invention to focus an interrogation pulse within a definite space so only SAW tags within that space are interrogated, the problem of code collision can be more easily controlled. Because the SAW tag reader 110 will only receive a limited number of responses to an interrogation pulse, its ability to distinguish between SAW tag 140 responses will be enhanced and the articles 120 to which SAW tags 140 are attached can be accurately identified.

One embodiment of the invention uses beam steering for focusing the interrogation pulse within the defined space to permit the SAW tag reader 110 to more easily discriminate between coded responses. There are a number of different beam steering techniques known to those of ordinary skill in the pertinent art, all of which are within the intended scope of the present invention. These range from mechanically steering the interrogation pulse beam to using an antenna array with a sophisticated electronic phase shifting apparatus to steer the beam.

Figure 2A:
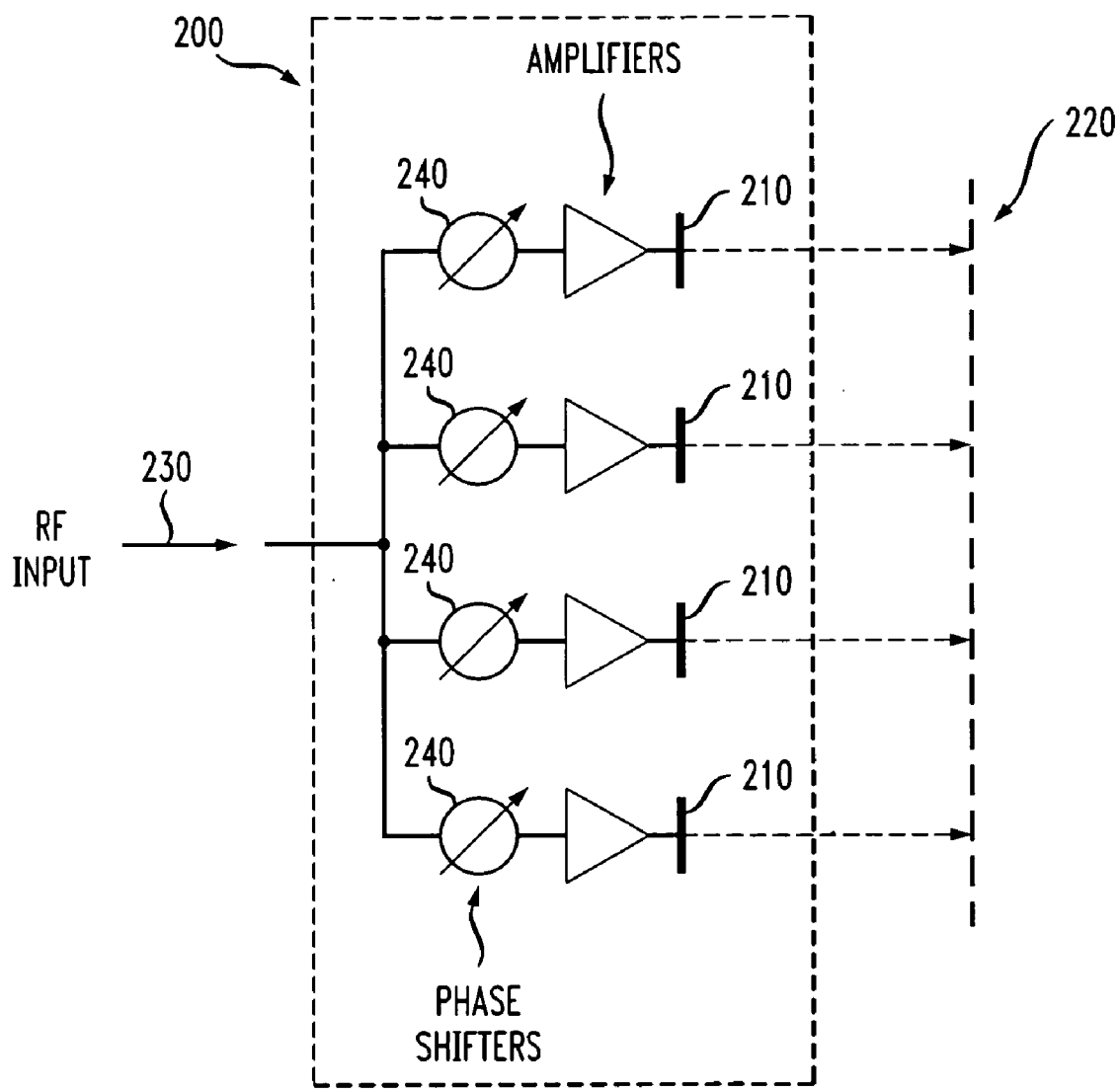
FIGS. 2A–2B illustrate a representative embodiment of an antenna array where signal phases delivered to the antennas are shifted to steer the transmitted interrogation pulse beam to a defined space.
Figure 2B:
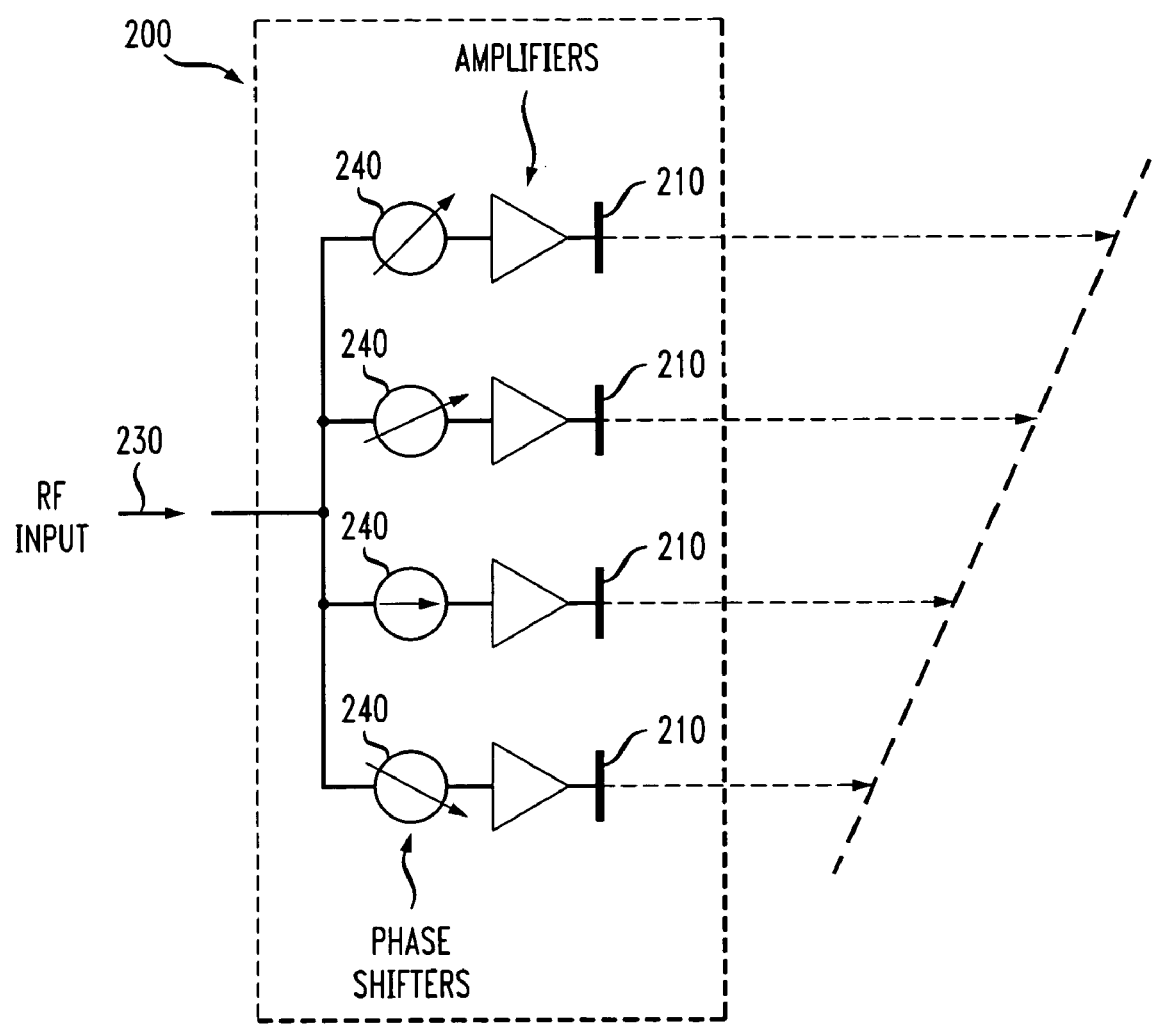

Turning now to FIGS. 2A–2B, illustrated is a representative embodiment of an antenna array 200 where signal phases delivered to the antennas 210 are shifted to steer the transmitted interrogation pulse 220 beam to a defined space. The input signal 230 to each antenna 210 in the array 200 is routed through an associated phase shifter 240, where the phase of the signal 230 delivered to the antenna 210 is shifted to steer the transmitted beam in a predetermined direction. If the phase of a signal 230 is not shifted, as illustrated in FIG. 2A, the signals 230 delivered to each antenna 210 will be in-phase and the interrogation pulse 220 will proceed directly away from the array 200. Illustrated in FIG. 2B is an example where the phase of the input signal 230 delivered to each antenna 210 is changed with the consequent result of redirecting the beam of the interrogation pulse 220.

An antenna array 200, such as that illustrated in FIGS. 2A and 2B, is especially useful because it lends itself to being fabricated as a printed antenna array 200. Using well known lithographic techniques, such printed antennas 210 can easily be integrated into printed circuits with the necessary electronics to control the phase of the signal to each antenna 210. Thus it is convenient to incorporate an entire antenna array 200 module into a SAW tag reader.

Figure 3:
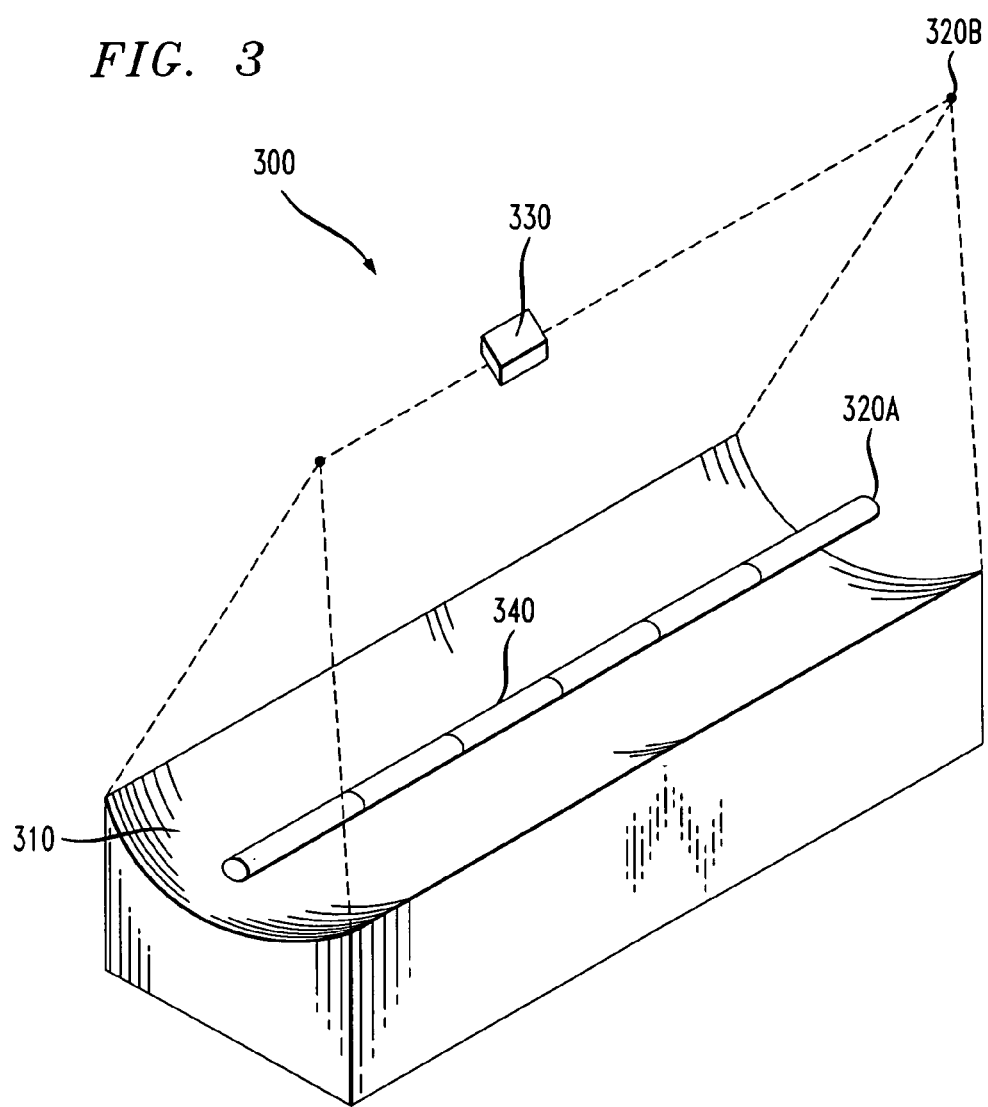
FIG. 3 illustrates an embodiment of an antenna configured as an elliptical trough for focusing an interrogation pulse within a defined space.

Turning now to FIG. 3, illustrated is an embodiment of an antenna 300 configured as an elliptical trough 310 for focusing an interrogation pulse within a defined space. Because an ellipse is a closed plane curve generated by a point moving in a manner that the sums of the distances between the moving point and two fixed points or foci 320A, 320B is a constant, an elliptical trough 310 is a particularly useful antenna configuration for reading SAW tags 330. When an interrogation signal is fed to an antenna 300 located at the first focal point 320A of the ellipse, the transmitted signal reflects and refocuses at the second focal point 320B where, optimally, a SAW tag 330 is interrogated. By using an elliptical trough 310 with a linear feed 340 extending the length of the trough 310, a second focal point 320B will also have a length equal to the linear feed 340. This is particularly useful for reading SAW tags 330 in certain environments, such as the article handling device 100 illustrated in FIG. 1. Where a SAW tag reader 110 has an elliptical trough 310 antenna 300, the second focal point 320B can be designed to extend across the width of the conveyor belt 130 so that each article 120 on the belt 130 is interrogated.

In another embodiment of the invention, the illustrated elliptical trough 310 is usefully employed in a cross beam configuration to precisely focus the interrogation signal and response. For example, one elliptical trough 310 used to transmit an interrogation signal can be positioned about perpendicular to another that receives a response, thus precisely focusing on the specific SAW tag 330 to be identified. As those of ordinary skill in the pertinent art will understand, either of the elliptical troughs 310 can be programmed to move in a sweeping pattern to provide a precisely focused beam across a field of interest, such as a conveyor belt where the trough 310 positioned across the belt is fixed but the trough 310 paralleling the belt is moved in a sweeping motion. Those of ordinary skill in the pertinent art will also understand that other configurations of elliptical troughs 310 as well other embodiments of antennas, waveguides and reflectors can also be used in an intersecting or cross beam focusing arrangement such as that described and be well within the intended scope of the present invention.

Figure 4:
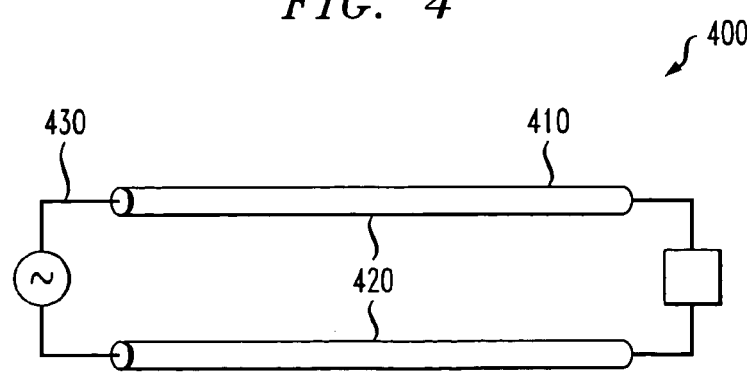
FIG. 4 illustrates an embodiment of a proximity wand reader using an antenna configured as a parallel conducting pair.

Turning now to FIG. 4, illustrated is an embodiment of a balanced feed proximity wand reader 400 using an antenna configured as a parallel conducting pair 410. The wand 400 has a parallel pair of transmission lines 420 that receive a feed signal 430. The feed signal 430 causes a field to develop around the wand 400 sufficiently strong enough to interrogate SAW tags by placing the wand 440 in close proximity. Those of ordinary skill in the pertinent art will understand that a single wire antenna can also be used with a wand 400 such as that illustrated and still be within the intended scope of the present invention.

Figure 5B:
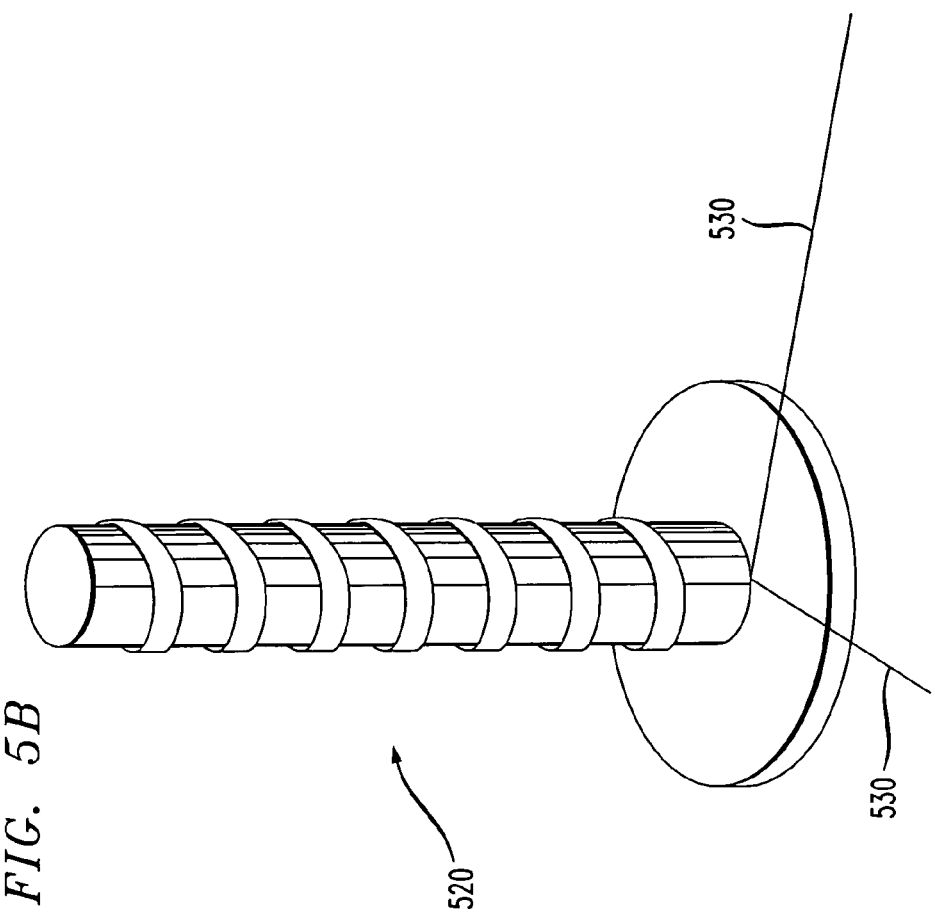
FIGS. 5A–5B illustrate an embodiment of a helical antenna and a helical signal generating device with two feed inputs for producing a circular polarized interrogation signal.
Figure 5A:
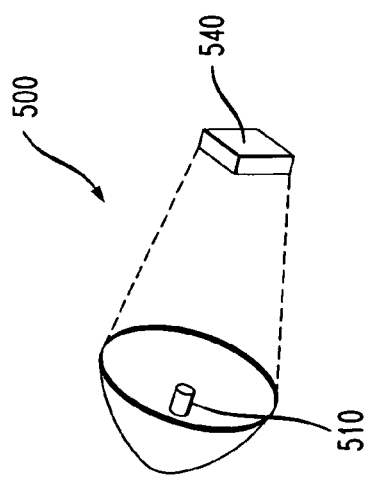

Turning now to FIG. 5A, illustrated is an embodiment of a helical antenna 500 used to focus an interrogation pulse. The illustrated antenna 500 has a canister 510 around a helical signal generating device 520 (FIG. 5B) to which a pulse interrogation signal is delivered by two feed inputs 530 located at about ninety degrees relative to each other. The helical signal generating device 520 produces a circular polarized interrogation signal that can be directed to within a defined space by the cannister 510 where a SAW tag 540 can be interrogated. Using a circular polarized signal to interrogate SAW tags 540 is particularly useful because a pulse can be delivered regardless of the SAW tag 540 orientation within a plane normal to the interrogation signal.

Figure 6A:
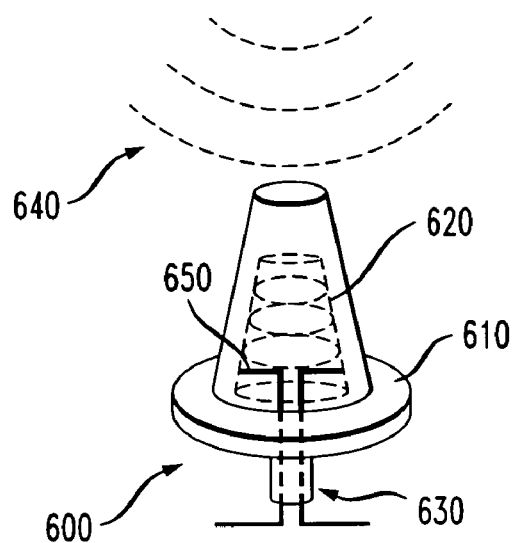
FIGS. 6A–6B illustrate embodiments of dielectric waveguide antenna structures for focusing an interrogation pulse.
Figure 6B:
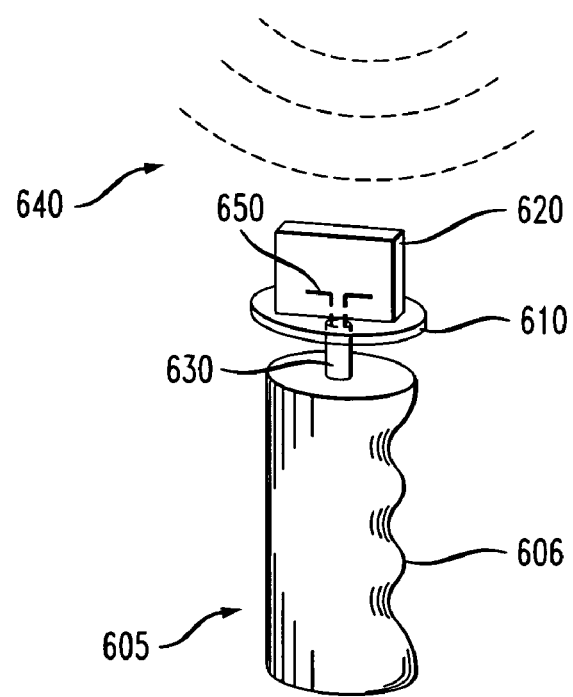

Turning now to FIGS. 6A–6B, illustrated are embodiments of dielectric waveguide antenna structures 600, 605 for focusing an interrogation pulse. The embodiment in FIG. 6B has a handle 606 that permits it to be used as a "wand" to focus interrogation pulses by hand. Each has a ground plane 610 with a dielectric waveguide 620 coupled thereto in an approximate normal position. A feed line 630, generally a coaxial cable, delivers an interrogation signal 640 or pulse to a dipole antenna 650 located within the dielectric waveguide 620. The propagation rate of the signal 640 through the dielectric material will be slower than such signal's 640 propagation rate in the air. The propagation rate of the signal 640 through the waveguide 620 material will also be dependent on the dielectric constant of such material. Because the distance the signal 640 must travel through the waveguide 620 before it reaches the surrounding air is a variable, the signal 640 will not all make the transition into the air at the same time. The waveguide 620 can be shaped, however, to provide for a significant portion of the propagated signal 640 to transition from the dielectric body of the waveguide 620 into the surrounding air at or near the same time, thus providing a concentrated signal 640 that is focused.

Figure 7:
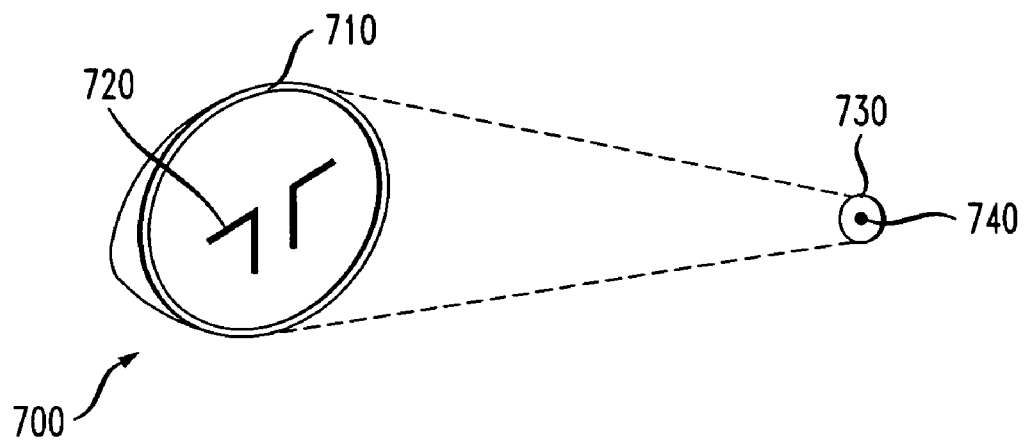
FIG. 7 illustrates an embodiment of an antenna apparatus with a reflector coupled to the antenna.

Turning now to FIG. 7, illustrated is an embodiment of an antenna apparatus 700 with a reflector 710 coupled to the antenna 720. The reflector 710 reflects the interrogation signal transmitted by the antenna 720 and focuses such signal to within a defined space within which a SAW tag 730 can be interrogated. Note that the illustrated reflector 710 has an elliptical shape that focuses the interrogation signal at a second focal point 740 where the SAW tag 730 is located. Although an elliptical shape can be advantageously used in certain situations, there are other situations calling for differently shaped reflectors. A useful aspect of this embodiment provides for the reflector to be selected from the group consisting of: a circular reflector; a curved reflector; a parabolic reflector; and an elliptical reflector. Of course, as will be understood by those of ordinary skill in the pertinent art, any reflector shape is within the intended scope of the present invention.

Figure 8:
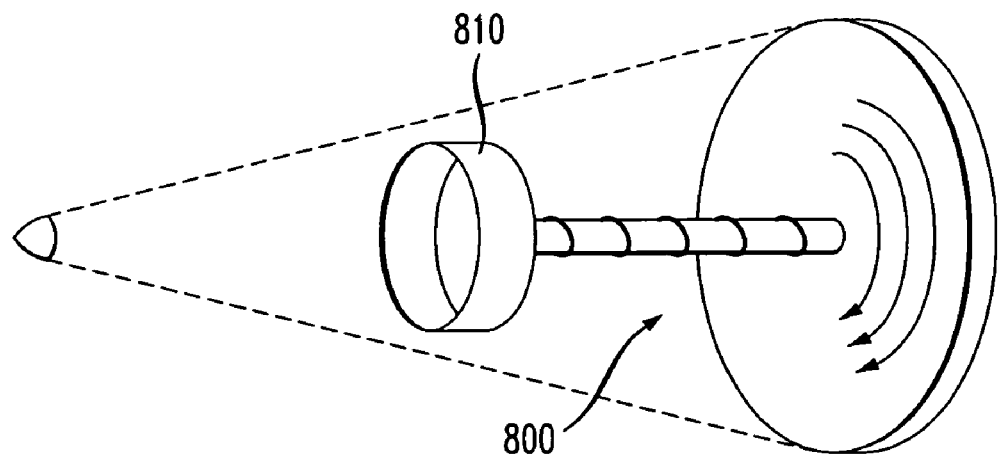
FIG. 8 illustrates an embodiment of a waveguide used to focus an interrogation pulse within a defined space.

Turning now to FIG. 8, illustrated is an embodiment of a helical source 800 for using circular polarized waves and a focusing antenna to address a SAW tag. Also illustrated is a reentrant cavity 810 to provide directionality for the helical source. Focusing reflectors of the type illustrated are discussed in more detail above relative to FIG. 7. Of course, as was the case above, a reflector can be selected from the group consisting of: a circular reflector; a curved reflector; a parabolic reflector; and an elliptical reflector.

Turning now to FIGS. 9A–9B, illustrated are embodiments of an interrogation pulse focusing device 900, 950 constructed in accordance with the present invention that can be used to launch both right hand and left hand circular polarized interrogation pulses 930. In FIG. 9A, a thin walled closed end cylinder 905 with two inputs 910, 915 is used to launch either right hand or left hand circular polarized interrogation pulses 930. The illustrated embodiment is metallic with a closed first end 920 (not shown) and an open second end 940. The two inputs 910, 915 used to launch the circular polarized interrogation pulses 930 are located at about one quarter of a wavelength from the closed first end 920 and positioned on the circumference of the cylinder 900 at about 90° relative to each other.

To launch a circular polarized pulse from the cylinder 900, a signal is fed to the cylinder 900 via the inputs 910, 915 which are positioned so they have a 90° degree phase angle delay relative to each other. For example, if a left hand polarized pulse is to be launched, the phase angle of the signal fed to the first port 910 will be a 0° while the phase angle of the signal fed to the second port 915 will be −90° relative to the first port 910 signal. This input produces a $TE_{11}$ electric field with a consequent clockwise rotating e field, thus launching a right hand circular polarized pulse 930 that retains its circular polarity after leaving the device 900. To launch a left hand circular polarized pulse 930, the phase angle of the signal fed to the second port 915 would have a +90° phase angle difference with respect to the phase angle of the signal fed to the first port 910. Those of ordinary skill in the pertinent art will understand that any transverse electric or transverse magnetic pattern can be produced and be within the intended scope of the present invention.

The embodiment illustrated in FIG. 9B functions in the same manner as that illustrated in FIG. 9A, except a solid dielectric cylinder 950 is used to launch right and left hand polarized pulses. This is particularly useful embodiment because a thin dielectric structure can be made that provides for a neat, compact device for launching either right hand and left hand circular polarized pulses 930. Of course, a dielectric cylinder 950 similar to that illustrated in FIG. 9A with a metallic surface, such as a plated surface, can also be used to launch circular polarized pulses and be within the intended scope of the present invention. As those of ordinary skill in the pertinent art will understand, the embodiments illustrated in FIGS. 9A–9B can be combined with reflector embodiments previously described herein and still be well within the intended scope of the present invention.

Turning now to FIG. 10, illustrated is a SAW tag 1000 embodiment where the response to an interrogation pulse can be turned off. A detailed description of SAW tags 1000 of the type illustrated is set forth in Hartmann One. The illustrated SAW tag 1000 has a substrate 1010 with a pair of transducers 1020 located thereon. As described below, depending on the phase of the transducers 1020 relative to one another, a SAW tag 1000 response can be turned off or on when interrogated by a right or left hand circular polarized interrogation pulse. Such a SAW tag 1000 can be usefully employed with interrogation pulse focusing devices of the type illustrated in FIGS. 9A–9B.

In one embodiment of the invention the phase centers of the two transducers 1020 are separated by (2n+½)n where n is an integer. In phase and quadrature antennas 1030 on the SAW tag 1000 that receive interrogation pulses directed to the transducers 1020 are oriented in positions 90° relative to each other. This means that circular polarized signals incident on such antennas 1030 will be in-phase in one direction and out-of-phase in the other. Each transducer 1020 will receive and generate a SAW only when it receives an in-phase signal. This feature is used to generate a unidirectional SAW that can be advantageously used to switch a SAW tag 1000 off. The "switch" that shuts the SAW tag 1000 down in the embodiment illustrated is an absorbing reflector 1040 that absorbs the SAW and does not return a response. The absorbing reflector 1040 and transducers 1020 can be constructed to absorb either right or left hand polarized interrogation pulses. Thus, if the SAW tag 1000 is constructed to absorb a left hand polarized interrogation pulses, it will only launch a SAW generating a response when a right hand polarized pulse is received. In short, the SAW tag 1000 is turned off when a left hand polarized pulse is received because the SAW from the transducer 1020 that received the left hand polarized pulse is absorbed by the absorbing reflector 1040.

The present invention also provides a method of operating a system for avoiding code collisions from multiple SAW identification tags. In one embodiment the method provides for focusing an interrogation pulse to within a defined space and then discriminating between the coded responses returned from tags located within that defined space. Such embodiment will be clear to those of ordinary skill in the pertinent art from the detailed description of the system itself. The additional embodiments of a method of operating the system described herein will likewise be clear to those of ordinary skill in the pertinent art based on the descriptions set forth.

Although the present invention has been described in detail, those skilled in the art should understand that they can make various changes, substitutions and alterations herein without departing from the spirit and scope of the invention in its broadest form.

What is claimed is:

1. A system for avoiding code collisions from multiple SAW identification tags, comprising:
    a directing means for directing an interrogation pulse having a circular polarity toward said tags, said interrogation pulse generating a corresponding SAW in each of said tags that travels a preselected direction; and
    a receiving means for recieving coded responses from only ones of said tags responding to said interrogation pulse.

2. The system as described in claim 1 wherein said circular polarity is clockwise.

3. The system as described in claim 1 wherein said circular polarity is counterclockwise.

4. The system as described in claim 1 further comprising using a hollow cylindrical waveguide to direct said interrogation pulse.

5. The system as described in claim 4 wherein said waveguide is metallic.

6. The system as described in claim 1 further comprising using a solid cylindrical waveguide to direct said interrogation pulse.

7. The system as described in claim 6 wherein said waveguide is a dielectric.

8. The system as described in claim 6 wherein said waveguide has a metallic outer surface.

9. The system as described in claim 1 further comprising a reflector to direct said interrogation pulse.

10. The system as described in claim 9 wherein said reflector is selected from the group consisting of:
    a circular reflector;
    a curved reflector;
    a parabolic reflector;
    a re-entrant cavity; and
    an elliptical reflector.

11. The system for avoiding code collisions from multiple SAW identification tags, comprising:
    a directing means for directing an interrogation pulse having a circular polarity toward said tags, said interrogation pulse generating a corresponding SAW in each of said tags that travels a preselected directionwherein said tags can be turned off; and
    a receiving means for recieving coded responses from only ones of said tags responding to said interrogation pulse.

12. The system as described in claim 11 wherein a transducer is used to turn off said tags.

13. The system as described in claim 11 wherein an absorbing reflector is used to turn off said tags.

* * * * *